United States Patent [19]

Yamamoto

[11] Patent Number: 4,641,701
[45] Date of Patent: Feb. 10, 1987

[54] DIES FOR FORMING A CHAIN

[76] Inventor: Ken Yamamoto, 18-19 5 Chome Kamiuma Setegaya ku, Tokyo, Japan

[21] Appl. No.: 400,942

[22] Filed: Jul. 22, 1982

[30] Foreign Application Priority Data

Jul. 22, 1981 [JP] Japan .......................... 56-109561[U]

[51] Int. Cl.$^4$ ............................................. B22D 19/12
[52] U.S. Cl. ...................................... 164/90; 164/113; 164/137; 164/339; 164/341; 264/242; 264/297.8; 425/577; 425/DIG. 34
[58] Field of Search ................... 164/9, 10, 11, 27–32, 164/90, 113, 137, 302, 303, 339, 340–342; 249/64; 264/242, 297.8, 334, 336; 425/545, 572, 577, 581, 588, DIG. 5, DIG. 34, DIG. 58

[56] References Cited

U.S. PATENT DOCUMENTS

| | | | |
|---|---|---|---|
| 2,555,754 | 6/1951 | Morin | 164/90 |
| 2,577,350 | 12/1951 | Morin | 164/90 |
| 4,206,799 | 6/1980 | McDonald | 425/577 |

FOREIGN PATENT DOCUMENTS

| | | | |
|---|---|---|---|
| 53-7934 | 3/1978 | Japan | 264/242 |
| 56-5654 | 2/1981 | Japan | 264/242 |

Primary Examiner—Nicholas P. Godici
Assistant Examiner—Richard K. Seidel
Attorney, Agent, or Firm—Donald D. Mon; David O'Reilly

[57] ABSTRACT

Chain forming dies having inner surfaces shaped to form a desired number of linked chain elements. The dies are adapted to close against one another and a casting gate to each chain element forming section is provided. The connection for the chain elements are formed by a die insert inserted in a groove between each chain element forming section. The die insert simultaneously forms holes on extrusions of each chain element and axial posts on the mating end of each adjacent chain forming element. Means are provided to position the die insert when the chain forming dies are closed against each other. Mating coupler elements are formed by coupler-shaped sections in the chain forming dies.

7 Claims, 16 Drawing Figures

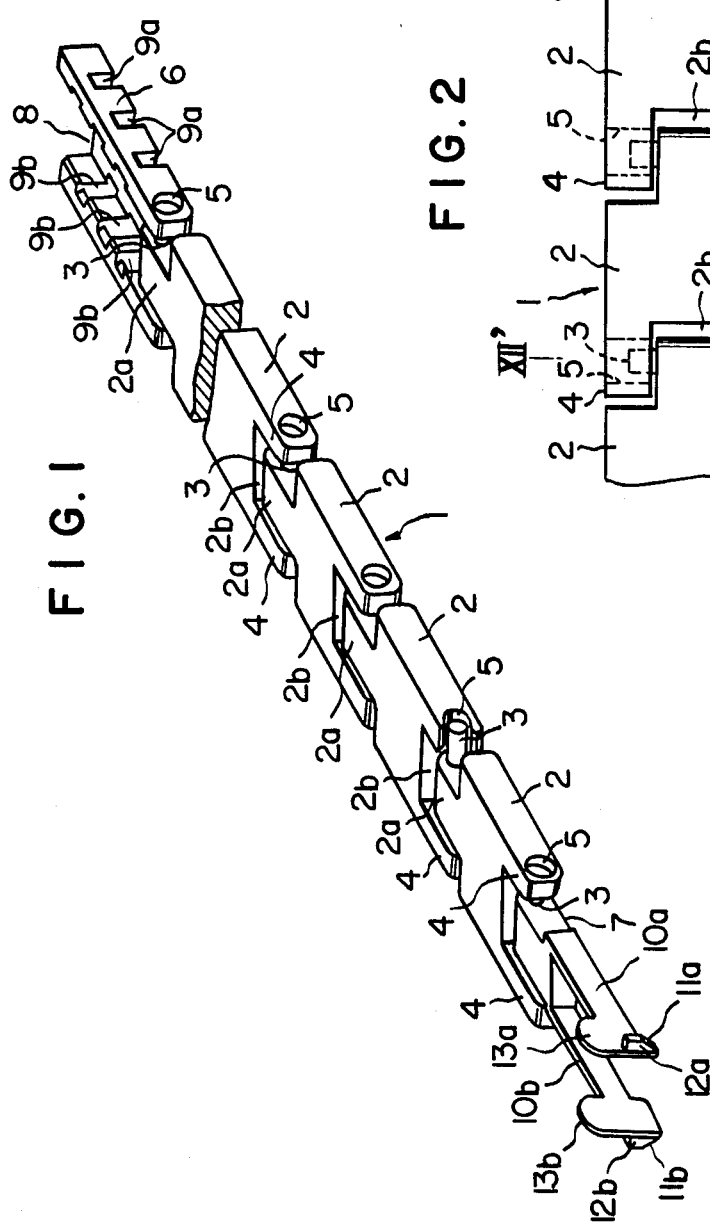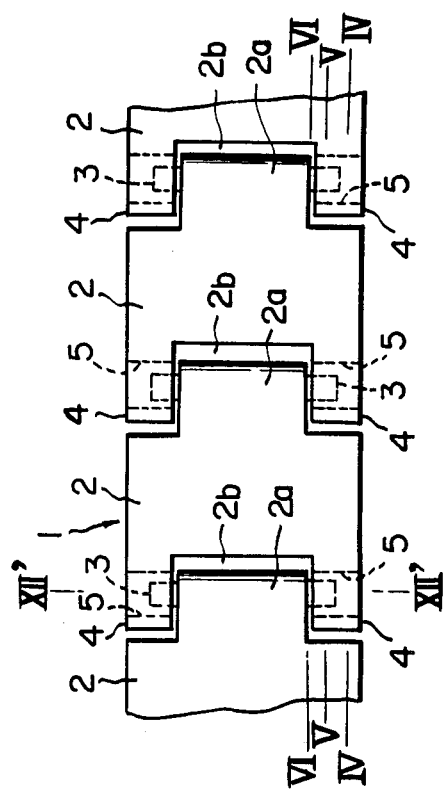

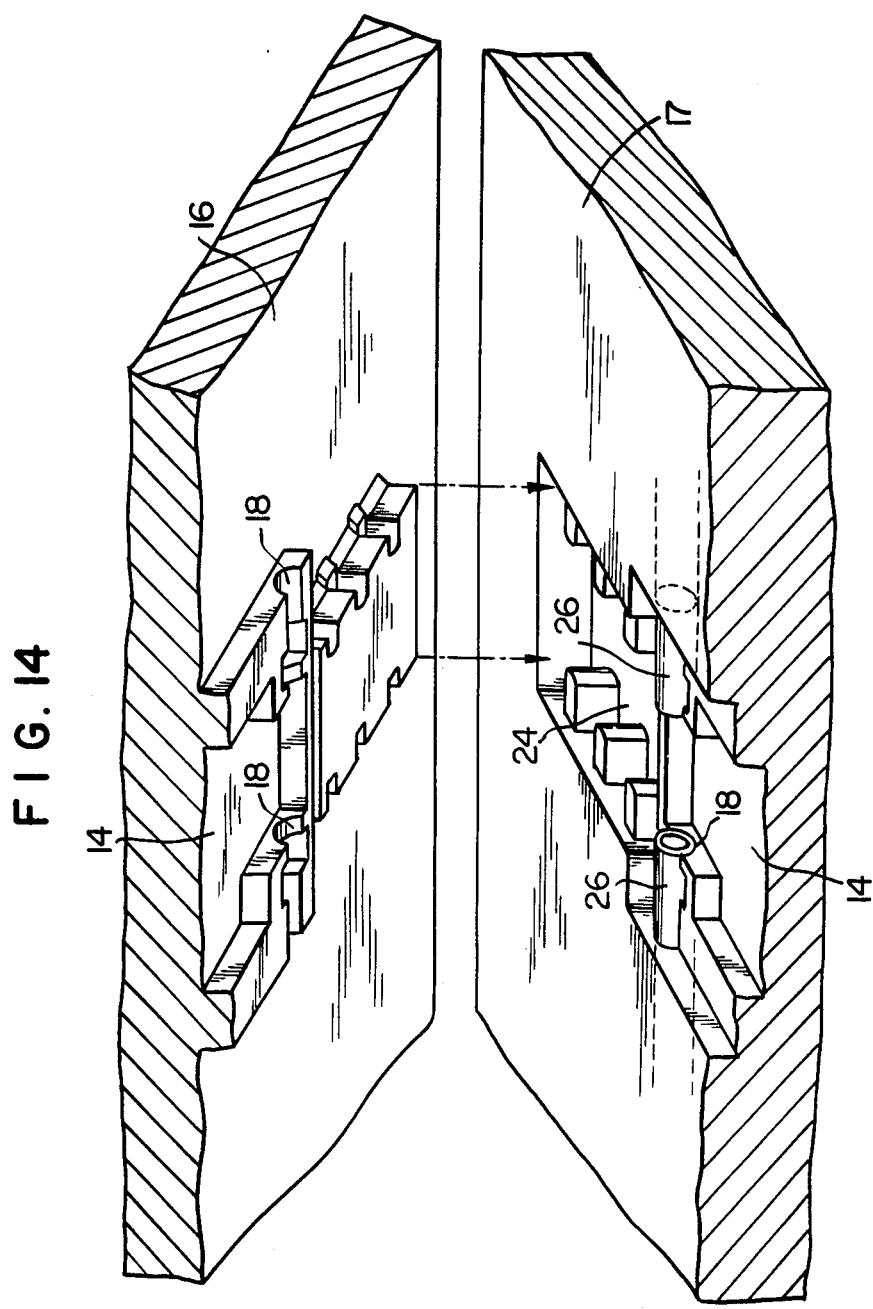

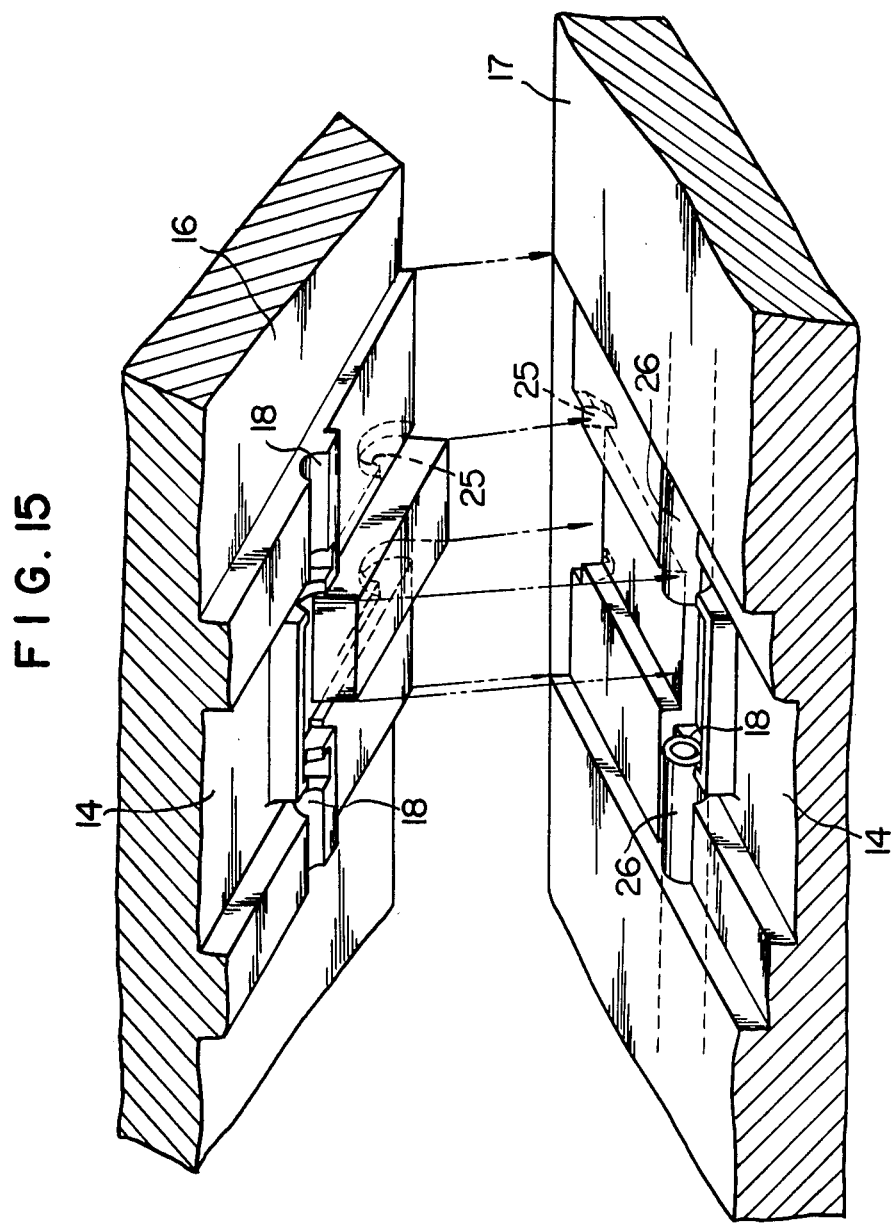

DIES FOR FORMING A CHAIN

FIELD OF THE INVENTION

This invention relates to dies for forming chains such as wrist watch straps, ornamental bracelets and the like (including things in which two chain elements are connected by an axis, for example, a lid and a case which are connected by a hinged axis).

BACKGROUND OF THE INVENTION

Conveniently, in the formation of a chain, desired numbers of chain elements are connected by a method, in which one chain element is connected to another end of the next chain element by inserting a pin into holes provided on both ends of each chain element and all chain elements are successively connected in turn by the same method, or by a method in which a special assembly for connection is employed. However, the conventional process has disadvantages in that connecting operations for the chain elements are required, resulting in high cost.

An object of this invention is to improve over the conventional process and to provide dies for forming a chain having a structure in which the desired number of chain elements are formed and connected by axes.

BRIEF DESCRIPTION OF THE INVENTION

A chain element forming die comprising two chain element forming dies having their inner surfaces shaped for forming the desired number of chain element of a chain. A casting gate is provided on each chain element forming section of the dies, which are capable of mating by opening or closing against each other. A connecting part element forming die insert means is slidably inserted into grooves or holes formed and located in the chain element forming dies between adjacent chain element forming die sections and are provided to form an axial post on one end of each respective formed chain element and at the same time, forming a hole into which the axial post fits or is inserted into to form the chain. Sections of the dies are also shaped to form coupling and connecting sections to complete the chain.

This invention will be fully understood from the following detailed description of an embodiment and the accompanying drawings, in which:

BRIEF DESCRIPTION OF THE DRAWINGS

FIG. 1 is an enlarged perspective view of one embodiment of a chain formed by the dies according to this invention:

FIG. 2 is a partially enlarged top plan view of FIG. 1;

FIGS. 14 and 15 are partially perspective views of dies for forming coupling devices connected to both ends of a chain; and of dies for forming the connecting part of a coupling device in the opened condition, for ease of understanding.

DETAILED DESCRIPTION OF THE INVENTION

Figure 3:
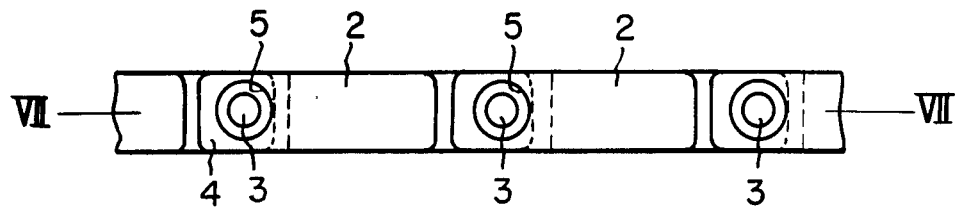
FIG. 3 is a partially enlarged side view of FIG. 1.
Figure 4:
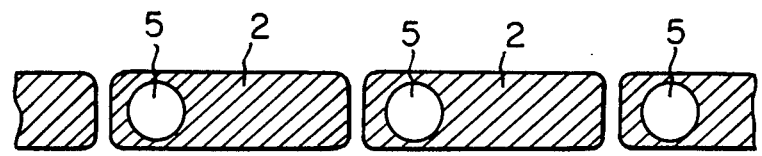
FIG. 4 is a cross-sectional view taken along the line IV—IV of FIG. 2.
Figure 5:
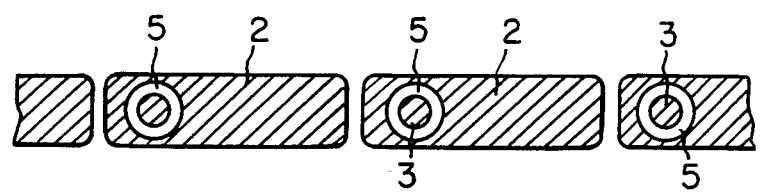
FIG. 5 is a cross-sectional view taken along the line V—V of FIG. 2.
Figure 6:
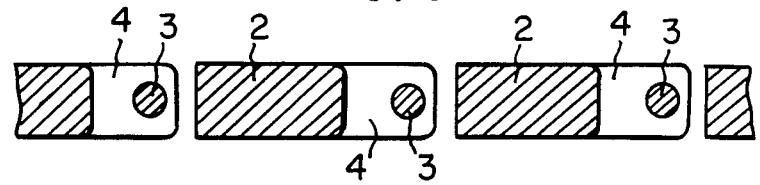
FIG. 6 is a cross-sectional view taken along the line VI—VI of FIG. 2.
Figure 7:
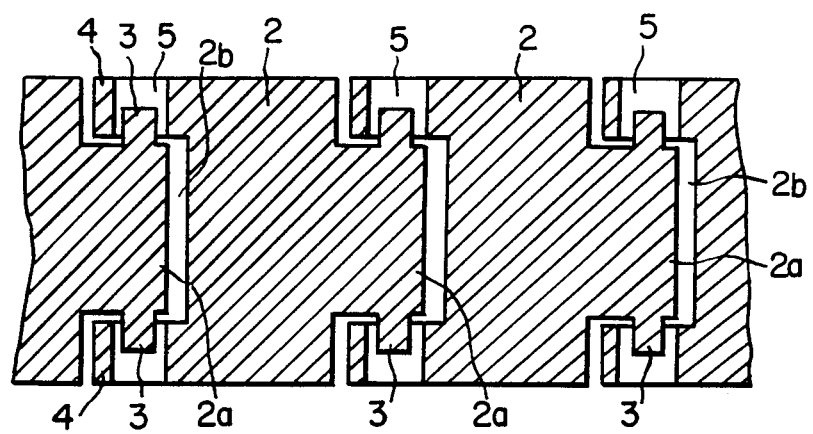
FIG. 7 is a cross-sectional view taken along the line VII—VII of FIG. 3.
Figure 8:
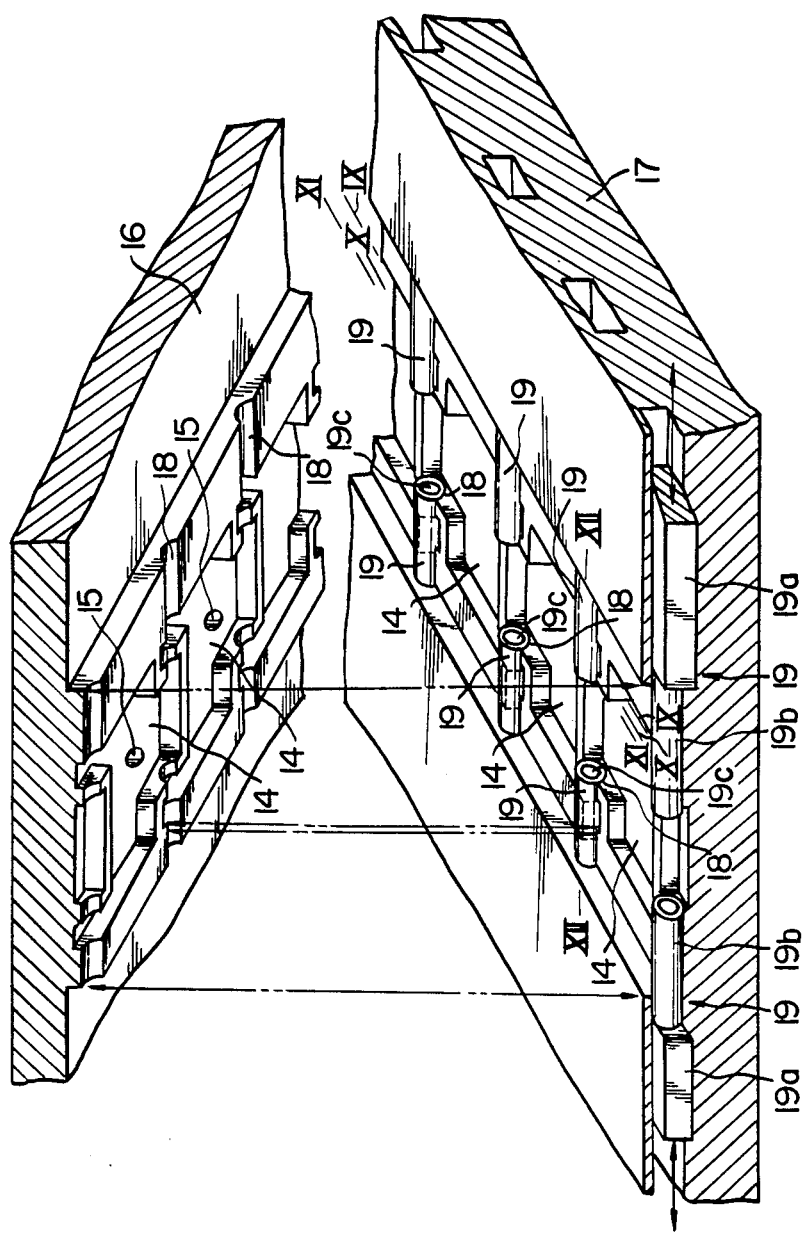
FIG. 8 is a perspective partial view of discs formed according to this invention, in the opened condition for ease of understanding.
Figure 9:
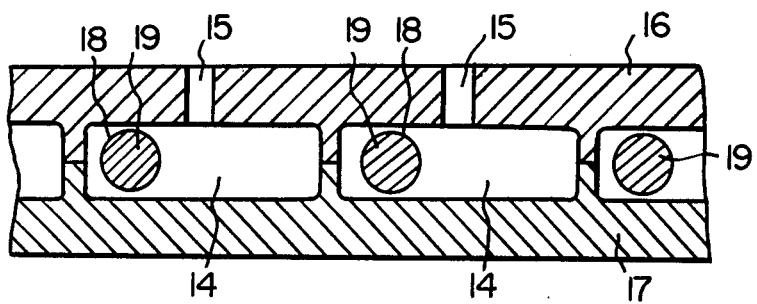
FIG. 9 is a sectional view of dies according to this invention, in the closed condition, taken along line IX—IX of FIG. 8.
Figure 10:
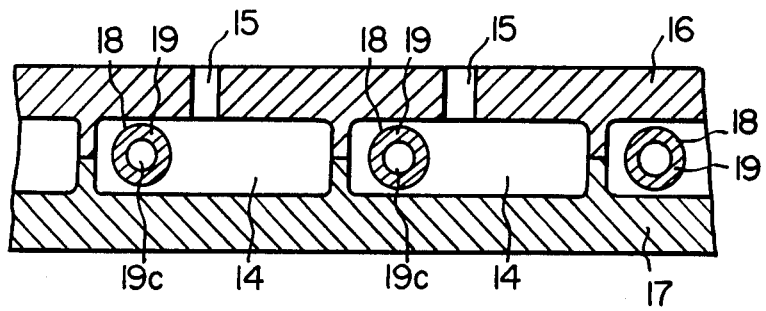
FIG. 10 is a sectional view taken along line X—X of FIG. 8.
Figure 11:
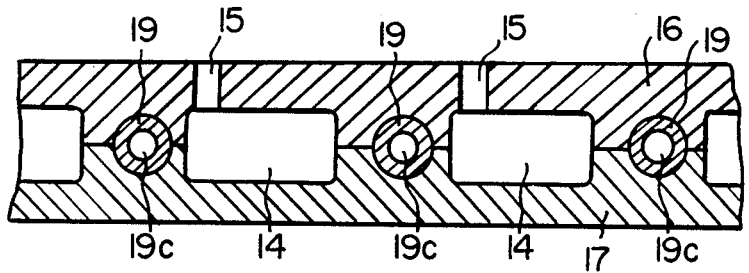
FIG. 11 is a sectional view taken along line XI—XI of FIG. 8.
Figure 12:
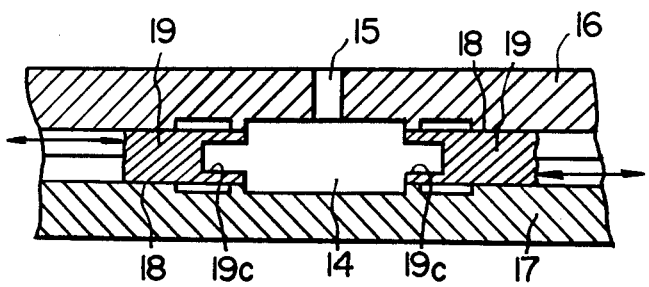
FIG. 12 is a sectional view taken along line XII—XII of FIG. 8.

In FIGS. 1 to 7, a chain 1 is composed of a desired number of chain elements 2. On one end of each chain element a projection 2a is provided and on the other end of each chain element a recess 2b is provided. Axial post 3 having an axis is integrally formed on opposite sides of said projecting part 2a of each chain element 2 and a hole 5 for receiving said axis is provided on each side of an extruded part 4 forming the recess 2b. An axis 3 is provided on the projecting part 2a of first element 2 is inserted into a hole 5 of an extruded part 4 of a second element 2 and an axis 3 of a projecting part 2a of the second element 2 is inserted into a hole 5 of an extruded part 4 of the next, namely, the third element. In this way, all elements are successively connected in turn to form a chain 1.

A coupling device 6 (coupler) connected to the end elements of a chain respectively can be coupled or released from each other and have a recessed channel 8 extending longitudinally in the upper surface thereof. The axis of post provided on projecting part 2a of the end element of a chain is inserted or fits into a hole formed on the end part of the recessed channel 8. Longitudinally equally spaced engaging slots or recesses 9a, 9b are formed on each side of the recessed channel (three engaging recesses on each side are shown in FIG. 1). The axis of part 3 on another coupling device 7 is inserted into hole 5 provided on extruded tips 4 of the other end element 2 of the chain 1. Two elastic or flexible arms 10a, 10b which can be sprung outwards are formed extending from the opposite end of the coupling device 7 away from the end where axial posts are formed. Engaging detent 12a, 12b having an inclined part 11a, 11b are provided at each outside tip part of the flexible arms. When inclined parts 11a, 11b of the engaging detents make contact with the inner side surfaces of the recessed channel 8 and are pushed down to engage with said engaging recesses 9a, 9b, the flexible arms are inserted and deformed inward into recessed channel 8. Further inserting force on the flexible arms 10a, 10b allows the engaging detents 12a, 12b to be completely engaged with the engaging recesses 9a, 9b by the outward spring force of the arms. Knobs (finger plates) 13a, 13b are provided on the upper part of tips of the flexible arms respectively.

Dies for forming a chain having the construction described in which the desired number of elements are connected comprise; two chain element forming dies and the desired number of connecting part die forming inserts for the chain.

Dies according to this invention comprise: two chain element forming dies 16, 17 having inner surfaces shaped for forming the desired number of chain elements 2 to build a chain 14, a casting gate (injection gate) 15 provided at each member or section of the chain forming element with the chain element forming dies 16, 17 being capable of opening or closing against each other. The connecting part element die forming inserts 19 are inserted into grooves or holes 18 located between the die forming elements 16, 17, in the space between adjacent members or sections 14 for forming a chain element and are provided for forming axial posts 3 on each side of projecting parts 2a of the chain element 2, and at the same time, for forming a hole 5, into which the axis of posts 3 fits or is inserted on each extruded tip 4, which forms the recessed part 2b of each chain element 2.

It goes without saying that the inner surface shape of die forming elements 16, 17 are defined by the corresponding shape of the element to be formed. Moreover, the die insert 19 for forming connecting elements has a slide-piece 19a and an axis 19b. The hole forming axis or socket 19c is provided in the forward part or end of the axis 19b. Positioning of the die insert 19 in grooves or holes 18 located between the die forming elements 16, 17 may be carried out by any suitable method such as angular pins, cylinders, etc.

Figure 13:
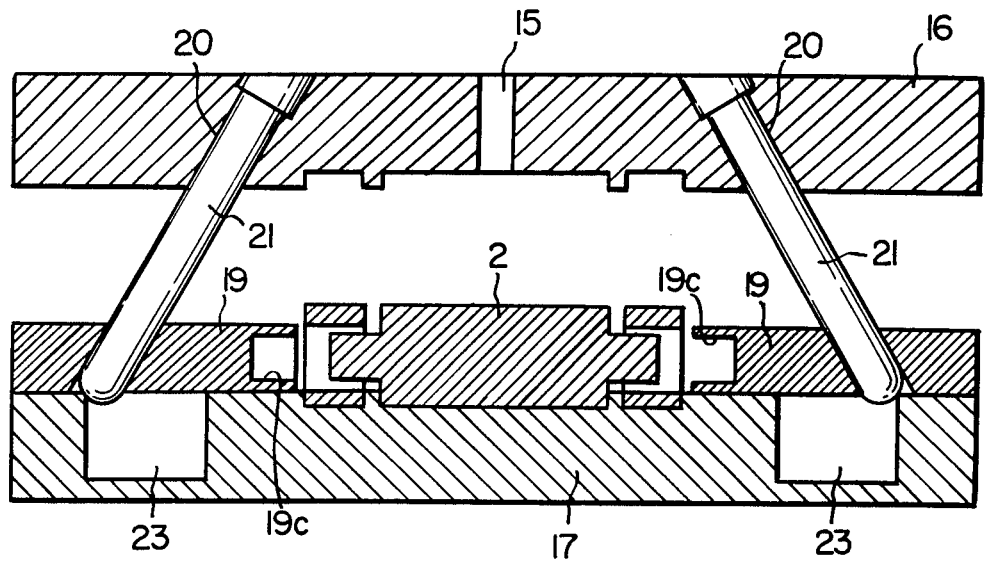
FIGS. 13(a) and (b) are illustrative sectional views of dies in the opened condition and in the closed condition respectively. In this case, dies for forming a connecting part of a chain element are engaged by means of angular pins.
Figure 13:
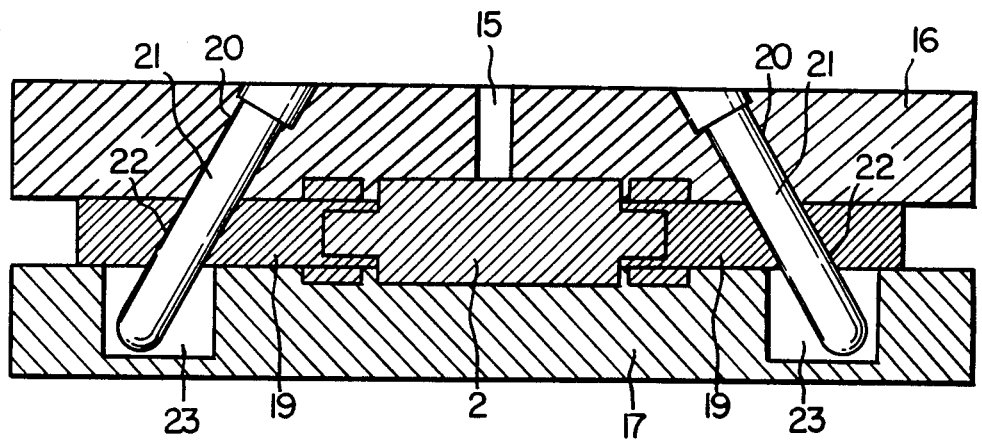

FIGS. (13a), (b) are illustrative section views of associated dies (16, 17 and 19) in which the die inserts 19 for forming connecting elements are positioned by employing angular pins. FIG. 13(a) shows the dies in opened condition and FIG. 13(b) shows them in closed condition. In this slide positioning system, an angular pin 21 fixed on an inclined hole or path 20 formed in a chain element forming die 16 is passed through an inclined hole or path 22 formed in the connecting part of die insert element 19 within inserting hole 18 located between die forming elements 16, 17. Recess 23 formed in the die forming element 17 receives the angular pin 21 as each die forming connecting part element 19 is automatically advanced or withdrawn by closing or opening of dies 16, 17.

The operation for forming a chain shown in FIGS. 1 to 7 is described below. Chain element forming dies 16, 17 are set in the closed position whereby the die insert 19 within grooves or holes 18 located between dies 16, 17 is slid to closed position (FIG. 13(b)) from the opened position (FIG. 13(a)). Materials such as plastics or molten metals are then injected through injection gate 15 to fill each chain element forming section or member 14 formed between dies 16, 17. By continued injection, the materials fill in axial post forming holes or sockets 19c. After solidification, the dies 16, 17 are opened, and the die inserts 19 within holes 18 located between dies 16, 17 are slid from the closed position (FIG. 13(b)) to the opened position (FIG. 13(a)) whereby a chain as shown in FIGS. 1 to 7, in which a desired number of elements 2 are connected by the axis of post 3, is obtained by molding.

If it is desired to form coupling devices 6, 7 capable of coupling or releasing from each other, as shown in FIG. 1, end parts of inner surface shape of section 14 of dies 16, 17 are formed; an injection gate (not shown) is provided on each member or section for forming coupling devices 24, 25; and a die insert 26 for forming the connecting part of the coupling device is also provided. The die insert 26 is an axis-forming die on each side of the projecting part 2a of the end element 2, and on each side of the basic part of coupling device 7 adjacent to the other element 2 of a chain. The die insert 26 is also a hole-forming die for forming a hole 5 on each side at the end of the recessed channel 8 of the coupling device 6, and on each side of the extruded tip which forms recess 2b of each part and the other end element 2 of a chain 1. By employing aforesaid associated dies (16, 17, 19 and 26) a chain having coupling devices 6, 7 at each end thereof respectively can be integrally formed by molding.

It is apparent that dies constructed according to this invention, comprising two element forming dies and a desired number of element connecting part forming die inserts along with associated dies, a chain having a construction in which the desired number of chain elements are connected with axes can be integrally formed. Moreover a chain having coupling devices can be integrally formed if both end parts of surfaces of sections for forming elements are shaped so as to form coupling devices capable of coupling or releasing and also two connecting part coupling forming dies are additionally provided.

This invention is not to be limited by the embodiment shown in the drawings and described in the description which is given by way of example and not of limitation, but only in accordance with the scope of the appended claims.

I claim:

1. Chain forming dies comprising; first and second die means; said first and second die means having an inner surface shaped to form chain elements when said chain forming dies are mated and closed against one another; die insert means for insertion in a groove between adjacent ends of chain element forming sections; said die insert means constructed and positioned to form axial posts on one end of a chain element and mating holes on extrusions on the end of each adjacent chain element; positioning means for positioning said die insert means when said chain forming dies are closed against each other; casting hole means for injecting and casting material to the chain element forming sections of said chain forming dies;

said positioning means for positioning said die inserts comprising: angular holes in one of said die means included with respect to the plane of said die inner surface and angularly disposed pins in said angular holes engaging an angular hole in each said die insert means; whereby said die insert means is axially slid into position when said chain forming dies are closed against one another.

2. The chain forming dies according to claim 1 in which the inner surface is shaped to form a coupling receptacle on one end of said chain and a coupling connector on the other end of said chain.

3. The chain forming dies according to claim 2 in which said positioning means comprises a groove between the adjacent chain element forming sections for receiving said die insert.

4. A method of forming a chain comprising: forming first and second chain element forming die means having their inner surface shaped to form a plurality of interlinked chain elements when said first and second chain element forming die means are closed against one another; inserting die insert means between chain element for forming sections for forming axial posts or one end of each chain element and holes in extrusions formed on each other end of each chain element with the posts fitting the holes; positioning said die insert when said first and second chain element forming dies are closed against one another; inserting angular pins in angular holes formed in one of said chain element forming die means are said die insert means whereby said die inserts are automatically positioned when said first and second chain element forming die means are brought together injecting chain forming material into the closed dies thereby forming a plurality of linked chain elements.

5. The method according to claim 4 in which grooves are formed on the inner surfaces of said first and second chain element forming dies between each chain element forming section for receiving and initially positioning said die insert.

6. The method according to claim 4 including shaping the inner surfaces of said first and second chain element forming die means to form a coupling means on one end and a connecting means on the other.

7. A connected article forming dies comprising; first and second die means; said first and second die means having an inner surface shaped to form connecting element when said connected article forming dies are mated and closed against one another; die insert means for insertion in a groove between adjacent ends of connecting element forming sections; said die insert means constructed and positioned to form axial posts on one end of a connecting element and mating holes on extrusions on the end of each adjacent connecting element; positioning means for positioning said die insert means when said connected article forming dies are closed against each other; casting hole means for injecting and casting material to the connecting element forming sections of said connected article forming dies; said positioning means for positioning said die inserts comprises: angular holes in one of said die means included with respect to the plane of said die inner surface and angularly disposed pins in said angular holes engaging an angular hole in each of said die insert means; whereby said die insert means are axially slid into position when said chain forming dies are closed against one another.

* * * * *